US000001255H

United States Statutory Invention Registration [19]

[11] Reg. Number: H1255

Sanders et al.

[43] Published: Nov. 2, 1993

[54] POLYESTER MOLDING COMPOSITIONS

[75] Inventors: Andrea Sanders, Milwaukee, Wis.; Bridget A. Spence, Houston, Tex.

[73] Assignee: Shell Oil Company, Houston, Tex.

[21] Appl. No.: 685,099

[22] Filed: Apr. 15, 1991

[51] Int. Cl.[5] ..... C08G 63/48
[52] U.S. Cl. ..... 525/69
[58] Field of Search ..... 525/69

[56] References Cited

U.S. PATENT DOCUMENTS

| | | | |
|---|---|---|---|
| 3,489,707 | 1/1970 | Fry | 260/31.6 |
| 3,925,299 | 12/1975 | Phillips | 260/40 R |
| 3,925,300 | 12/1975 | Roberts et al. | 260/40 R |
| 4,080,348 | 3/1978 | Korpman | 260/27 BB |
| 4,096,203 | 6/1978 | St. Clair | 260/876 B |
| 4,329,438 | 5/1982 | Yamori et al. | 525/64 |
| 4,670,485 | 6/1987 | Hesse | 525/69 |
| 4,775,718 | 10/1988 | Broekhuis | 525/69 |
| 4,851,474 | 7/1989 | Willis | 525/92 |

OTHER PUBLICATIONS

S. N. Tong & P. Wu, "Supertough Unsaturated Polyester and Its SMC", 42nd Annual Conf., Composites Institute, Feb. 1987, pp. 2–6.

J. Korb, "ETP: Elastomer-Toughened Polyesters", 39th Annual Conf., Soc. of the Plastics Industry, Jan. 16–19, 1984, pp. 1–9.

*Primary Examiner*—Robert L. Stoll
*Assistant Examiner*—Joseph D. Anthony
*Attorney, Agent, or Firm*—Keith M. Tackett

[57] ABSTRACT

Polyester molding compositions which contain an unsaturated polyester and an additional monomer for curing the polyester are improved by addition of a block copolymer which is modified with an unsaturated polyester. The block copolymer is an unsaturated block copolymer of a monoalkenyl aromatic hydrocarbon and a conjugated diene. The block copolymer is preferably produced by polymerizing styrene-butadiene diblock copolymer arms and coupling the arms with a difunctional coupling agent.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYESTER MOLDING COMPOSITIONS

BACKGROUND

This invention relates to modified elastomeric block copolymers. More particularly, this invention relates to modified block copolymers which are useful in blends with polyester molding compositions.

The use of unsaturated polyesters in thermosetting molding compositions is well known. Generally, these compositions comprise an unsaturated polyester, a vinyl monomer and a curing agent. The thermosetting resin composition may also comprise other additives such as fillers, reinforcing agents, anti-shrinking agents, thickeners and the like. The unsaturated polyester resin compositions generally exhibit excellent rigidity, heat resistance and electrical characteristics when used in thermosetting applications. Products prepared with unsaturated polyester molding compositions do not, however, generally exhibit good impact resistance or good surface characteristics. The poor surface characteristics are attributed to shrinkage during curing of the composition.

U.S. Pat. No. 4,329,438 teaches improved polyester molding compositions which contain a carboxylated derivative of a styrene-butadiene block copolymer. Specifically, the styrene-butadiene block copolymer is modified by grafting an unsaturated dicarboxylic acid or an unsaturated dicarboxylic acid derivative to the block copolymer. According to the disclosure, signficant improvement of blend properties including surface appearance are realized.

U.S. Pat. No. 4,851,474 teaches polyester resin compositions having improved impact resistance and surface characteristics wherein shrinkage is controlled by addition of a hydroxyl or carboxyl terminated conjugated diene polymer which has been hydrogenated and reacted with an unsaturated polyester. The product of the reaction was believed to have blocks of polyesters attached predominantly at the terminal carboxyl or hydroxyl sites. Coupling of the carboxyl terminated polymers is avoided.

SUMMARY OF THE INVENTION

Polyester molding compositions which contain an unsaturated polyester and an additional monomer for curing the polyester are improved by addition of a block copolymer which is modified with an unsaturated polyester. The block copolymer is an unsaturated block copolymer of a monoalkenyl aromatic hydrocarbon and a conjugated diene. The block copolymer is preferably produced by polymerizing styrene-butadiene diblock copolymer arms and coupling the arms with a difunctional coupling agent.

DETAILED DESCRIPTION OF THE INVENTION

The present invention is a low profile additive for polyester resin compositions comprising a block copolymer having at least one polymeric block of a monoalkenyl aromatic hydrocarbon and at least one polymeric block of a conjugated diolefin, the diolefin block being grafted to an unsaturated polyester through unsaturation contained in the polyester. The block copolymer may be functionalized prior to grafting of the polyester as long as most of the initial ethylenic unsaturation of the polymer is retained.

Any of the linear or substantially linear block copolymers comprising at least one polymeric block of a monoalkenyl aromatic hydrocarbon and at least one polymeric block of a conjugated diolefin known in the prior art may be used to prepare the polymers of the present invention. Particularly useful block copolymers which may be used in the present invention are those block copolymers satisfying the formula A—B or A—B—Y—$(B—A)_n$, wherein each A is a block of a monoalkenyl aromatic hydrocarbon, each B is a block of a conjugated diolefin monomer unit, and Y is the residue of a coupling agent. Block copolymers which are preferably used in the present invention are the highly coupled styrene-butadiene-styrene (S—B—S) block copolymers described in U.S. Pat. No. 4,096,203 which is incorporated by reference herein.

The block copolymers useful in the present invention will contain monoalkenyl aromatic hydrocarbon polymer blocks having weight average molecular weights within the range from about 5,000 to about 50,000 while the weight average molecular weight of the conjugated diolefin polymer blocks useful in this invention will be within the range from about 10,000 to about 150,000. In general, the monoalkenyl aromatic hydrocarbon blocks will comprise from about 2 to about 50 wt % of the polymer while the conjugated diolefin will comprise from about 50 to about 98 wt % thereof. The block copolymers useful in the present invention may have conjugated diolefin 1,2-micro structures within the range from about 7 to about 100% but concentrations within the range from about 10 to about 50% are most effective.

Suitable monoalkenyl aromatic hydrocarbon monomers include styrene and various alkyl-substituted styrenes. Suitable conjugated diolefin monomers include 1,3-butadiene and isoprene.

The block copolymer useful in the present invention may be grafted with any of the unsaturated polyesters known in the prior art and prepared by condensation of an unsaturated dicarboxylic acid and/or an anhydride thereof and a polyhydric alcohol. The modified block copolymer useful in this invention may then be blended with any one of the unsaturated polyesters known to be useful to prepare a polyester resin composition. The unsaturated polyester actually combined with the modified block copolymer may be the same or different from the one actually grafted to the block copolymer although it is believed that best results are achieved when the unsaturated polyester grafted to the block copolymer is the same as the unsaturated polyester with which it is blended to prepare the polyester resin composition. Suitable unsaturated polyesters include those obtained by replacing up to about 90 mol % of the unsaturated dicarboxylic acid or anhydride thereof with a saturated dicarboxylic acid or an anhydride thereof.

Suitable unsaturated dicarboxylic acids or anhydrides thereof which may be condensed to prepare the unsaturated polyester which may be grafted to the block copolymer in this invention and subsequently blended therewith include maleic, fumaric, itaconic, citraconic, chloromaleic, mesaconic, glutaconic and the like. Suitable saturated dicarboxylic acids or anhydrides thereof which may be substituted for a part of the unsaturated dicarboxylic acid or anhydride thereof include, but are not necessarily limited to, valeric, succinic, adipic, azelaic, terephthalic, isophthalic, chlorendic, tetraflorophthalic and the like. Suitable polyhydric alcohols, particularly dihydric alcohols which may be used in preparing polyesters useful in the present invention include, but are not necessarily limited to, linear glycols such as ethylene glycol, propylene glycol, dipropylene glycol, diethylene glycol, 1,3-butanediol, neopentyl glycol, 1,4-cyclohexane dimethanol, mixtures of these glycols and cyclohexane dimethanol with hydroxy-alkyl ethers of bisphenol A and the like. Suitable unsaturated polyesters include those described in U.S. Pat. Nos. 3,925,299; 3,925,300 and 3,489,707, the disclosure of which patents are herein incorporated by reference.

In general, the low profile additive will contain from about 4 to about 15 wt % polyester based on combined polyester and block copolymer.

The modified block copolymers of this invention are grafted with the unsaturated polyester in a suitable solvent. As presently contemplated, solution grafting will be accomplished at a temperature within the range from about 130° to about 250° C. As a result, when the grafting reaction is to be completed at atmospheric conditions suitable high temperature solvents including but not limited to, ortho-dichlorobenzene, ortho-xylene, diisopropylbenzene, bromobenzene and the like will be used. When the reaction is to be completed in pressure equipment essentially any suitable solvent that will remain liquid at the conditions employed may be used. Such solvents include, but are not limited to, tetrahydrofuran, toluene, benzene and the like. These reaction condition temperatures are, of course, sufficiently high to generate free radicals. Nonetheless, free radical initiators such as the various organic peroxides, hydroperoxides and various organoazo compounds may be used.

During solution grafting, the block copolymer will, initially, comprise from about 50 wt % to about 99 wt % of the total polymer molecular weight in solution while the unsaturated polyester will comprise from about 1 to about 50 wt % of the same polymer total in solution. The total polymer concentration in solution will range from about 5 to about 25 wt % based on polymer plus solvent. Excess unsaturated polyester will be separated, when necessary, from the product by contacting with a suitable extraction solvent such as acetone, acetic acid, dimethylsulfoxide, dimethylformamide and the like.

Any of the curing agents known in the prior art to be useful in thermosetting unsaturated polyester resin compositions may be used in the composition of the present invention. Curing agents are conventional free radical polymerization initiators, particularly organic peroxides and hydroperoxides. Suitable curing agents, then, include benzoyl peroxide, dicumyl peroxide, methylethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. In addition, various azo compounds such as 2,2'-azobisisobutyronitrile may be used. A particularly preferred curing agent is t-butylperbenzoate.

The ingredients of the thermosetting resin composition of this invention may be combined by a mixing technique which involves moderate to high shear agitation. This can be accomplished by means of twin rotor mixers designed to give moderate shear to the paste-like ingredients. It is essential to provide some shear and because of the viscosity of the materials being mixed, proper mixing cannot be obtained simply by stirring or by using a conventinal impeller mixer. On the other hand, high intensity mixing which would generate excessive heat (thereby raising the temperature more than about 100° C.) and activate the catalyst must be avoided. This mixing under sufficient shear to achieve good dispersion of the ingredients without heat buildup sufficient to activiate the catalyst insures a good blend and is necessitated by the fact that the resin composition may contain normally solid material. Shear which gives a moderate heat buildup, preferably, between about 2° to about 40°C. is particularly satisfactory. Low shear is preferred for bulk molding compositions (BMC) to avoid glass degradation. The modified block copolymer of this invention may be blended with any unmodified unsaturated polyester used in the blend before incorporating the same into the molding composition or each of these components may be added separately during the mixing. Preferably, however the modified block copolymers and polyester will be blended before incorporation into the molding composition.

The unsaturated polyester resin composition may also comprise other components such as fillers, reinforcing agents, anti-shrinking agents, thickeners, and the like. These components will, generally, be added to the unsaturated polyester resin composition after the unsaturated polyester resin continuous phase is combined with the modified block copolymer in a suitable crosslinking solvent. The unsaturated polyester resin compositions of this invention may be used in BMC and SMC molding applications.

In general, any of the vinyl monomers known to be useful in polyester resin compositions may be used in the thermosetting resin composition of the present invention. Suitable vinly monomers include styrene and substituted derivatives thereof such as, for example, alphamethylstyrene, aminostyrene, methylethylaminostyrene, methoxy-styrene, chlorostyrene, dichlorostyrene, dimethylstyrene, trimethyl-styrene, t-butylstyrene, sodiumstyrene sulfonate, p-benzylstyrene, p-phenoxystyrene and similar aryl-substituted styrenes. Suitable vinyl monomers also include beta-hydrocarbyl substituted derivatives of acrylic acid in which the betahydrocarbyl substitution has 1 to about 8 carbon atoms such as, for example, ethylacrylic acid, propylacrylic acid, butylacrylic acid, amylacrylic acid, hexylacrylic acid, heptyl-acrylic acid, octylacrylic acid, phenylacrylic acid and vinylacrylic acid. Suitable vinyl monomers also include various acrylates and substituted acrylates such as, for example, methylacrylate, methyl methacrylate, ethylacrylate, butylmethacylate, butylacrylate and the like.

Having thus broadly described the present invention, it is believed that the invention will become even more apparent by reference to the following examples which include Applicant's best mode. It will be appreciated, however, that the examples are presented solely for purposes of illustration and should not be construed as limiting the invention unless one or more limitations introduced in the examples are specifically incorporated into the claims appended hereto.

EXAMPLES

As demonstrated in the subsequent examples, the unsaturated polyester resin compositions containing an unsaturated block copolymer that is grafted with a polyester, when used in SMC applications, have improved surface characteristics when compared to similar products prepared without grafting of a polyester to the block copolymer. Also in the Examples, polyester resin compositions were prepared with saturated styrene-butadiene block copolymers for comparative purposes. Compositions prepared with saturated block copolymers or unsaturated, carboxylated block copolymers have very good appearance that is only slightly improved by grafting of polyester to the block copolymers. On the other hand, grafting of polyester to unsaturated block copolymers significantly improves the appearance of the compositions and retains ease of processing.

The surface appearance of the polyester compositions was visually compared using a grading scale of 1 to 5 with 1 being the worst and 5 being the best evaluation.

EXAMPLE 1

An unsubstituted, unsaturated styrene-butadiene diblock (S—B) copolymer was grafted with an unsaturated polyester to give grafted block copolymers having about 3% by weight of the polyester as measured by NMR. The block copolymer had an initial molecular weight of 13,100 for the styrene block and 60,800 for the butadiene block and contained 2.3 % by weight of coupled polymer.

The polyester grafted block copolymers were prepared by addition of a solution containing 40 g of the styrene-butadiene block copolymer in 360 g of o-dichlorobenzene to a glass reactor equipped with a thermometer, reflux condenser, and stirring mechanism. Then a solution containing 12.5 g of a propylene-maleate polyester (Koppers 3702-5, free from styrene monomer) in 112.5 g of o-dichlorobenzene was added and 0.0166 g of p-toluene-sulfonic acid was also added. The mixture was heated to reflux temperature (approximately 183° C.), with stirring, and was allowed to react at this temperature with vigorous stirring for 3 hours under a nitrogen atmosphere. Addition of 0.04 g of Ethanox 330 antioxidant did not appear to inhibit the reaction.

After cooling to room temperature, unreacted polyester was removed from the grafted block copolymer by the following procedure. The reaction solution was transferred to a glass jar, an equal volume of acetic acid was added, and the mixture was shaken. The white modified block copolymer separated to the top, and the lower o-dichlorobenzene/acetic acid layer was removed. The modified block copolymer was then dissolved in 110 ml of cyclohexane, 110 ml of acetic acid was added, and the mixture was shaken. As before, the white modified block copolymer separated to the top, and the lower cyclohexane/acetic acid layer was removed. Residual acetic acid was removed by dissolution of the modified block copolymer in cyclohexane followed by precipitation with isopropanol and thorough drying.

The polyester grafted block copolymers were compounded into a sheet molding composition by dissolution of 30 g of block copolymer (or combination of block copolymers) in 70 g of styrene. In one case, 25 g of polyester grafted block copolymer was used in combination with 5 g of the base polymer as the polymer modifier in the sheet molding composition. In the other case, 30 g of polyester grafted block copolymer was used. The block copolymer/styrene solution was combined with 100 g of propylene-maleate polyester resin (Koppers 3702-5--approximately 60% w polyester in styrene). The polyester in the resin was the same as that used to form the polyester grafted block copolymer. The two solutions were mixed with a 1 inch Jiffy blade at 500 rpm for 3 minutes and allowed to stand for at least 6 days to monitor separation of the mixture. After this time, the mixture was reblended under the same conditions and 0.5 g of black pigment was added. All subsequent mixing was done with a 1 inch Jiffy blade at 500 rpm. Then 300 g of $CaCO_3$ filler was added slowly to allow full wetting and 6 g of Zn stearate was added followed by 2.6 g of t-butylperbenzoate catalyst, 0.5 g of promoter (Air Products PEP-100, a proprietary organometallic complex), and 7.8 g of $Mg(OH)_2$ thickener. The paste was allowed to thicken for 21 days after which time a plaque (approximately $3.5\times3.5\times0.125$ inch) was compression molded at 350° F. for 6 min under 490 psi pressure.

Table I presents the properties of the plaques prepared from the sheet molding compositions.

COMPARATIVE EXAMPLE 1

The base polymer of Example 1 was compounded into a sheet molding composition as described in Example 1. Table I includes properties of the plaque prepared from the base polymer.

EXAMPLE 2

An hydroxyl substituted, unsaturated styrene-butadiene diblock (S—B—OH) copolymer containing no more than one terminal hydroxyl group per molecule was grafted with an unsaturated polyester to give grafted block copolymers having about 5% by weight of the polyester. The block copolymer had an initial molecular weight of 13,100 for the styrene block and 61,100 for the butadiene block and contained 2% by weight of coupled polymer.

The polyester grafted block copolymers were prepared by the method described in Example 1. In one case, twice the scale was used, and the total polymer concentration was 15% w in o-chlorbenzene. Addition of 0.0804 g of Ethanox 330 antioxidant did not appear to inhibit the reaction.

The polyester grafted block copolymer was compounded into sheet molding compositions by the method described in Example 1. In one case the polymer modifier consisted of 25 g of polyester grafted block copolymer and 5 g of base block copolymer, in the other case all of the polymer modifier added was polyester grafted block copolymer.

Table I presents the properties of plaques prepared from the sheet molding compositions.

COMPARATIVE EXAMPLE 2

The base polymer of Example 2 was compounded into a sheet molding composition as described in Example 2. Table I includes properties of the plaque prepared from the base polymer.

EXAMPLE 3

An unsubstituted, unsaturated styrene-butadiene triblock (S—B—S) copolymer was grafted with an unsaturated polyester to give a grafted block copolymer having about 3% by weight of the polyester. The block copolymer was prepared by coupling a diblock copolymer having an initial molecular weight of 10,200 for the styrene block and 29,300 for the butadiene block and contained 83 % by weight of coupled polymer. The coupling agent was dibromoethane.

The polyester grafted block copolymer was prepared by addition of a solution containing 40 g of the block copolymer in 360 g of o-dichlorobenzene to a glass reactor equipped with a thermometer, reflux condenser, dropping funnel and stirring mechanism. Then, 0.0166 g of p-toluenesulfonic acid was added. The reaction was performed under a nitrogen atmosphere. The mixture was heated to reflux temperature (approximately 183° C.) with stirring. While maintaining reflux, a solution containing 12.5 g of a propylene-maleate polyester in 112.5 g of o-dichlorobenzene was then added dropwise with stirring over a period of 4½ hr. After addition of the polyester was complete, heating was continued for another ½ hr. After cooling to room temperature, the solution was added to a large volume of isopropanol, and the precipitated polymer was filtered and dried.

Unreacted polyester was removed from the polyester grafted block copolymer by the following procedure. The polyester grafted block copolymer was dissolved at 10% by weight in cyclohexane, an equal volume of acetic acid was added, and the mixture was shaken. The white polyester grafted block copolymer separated to the top, and the lower cyclohexane/acetic acid layer was removed. Another aliquot of acetic acid was added, the mixture was shaken, and the lower cyclohexane/acetic acid layer was removed as before. Residual acetic acid was removed from the polyester grafted block copolymer by dissolution in cyclohexane followed by precipitation with isopropanol and thorough drying.

The polyester grafted block copolymer was compounded into a sheet molding composition by the method described in Example 1. The polymer modifier consisted of 24.5 g of polyester grafted block copolymer and 5.5 g of base block copolymer.

Table I presents the properties of plaques prepared from the sheet molding compositions.

COMPARATIVE EXAMPLE 3

The base polymer of Example 3 was compounded into a sheet molding composition as described in Example 3. Table I includes properties of the plaque prepared from the base polymer.

EXAMPLE 4

A mixture of a carboxyl substituted styrene-butadiene diblock (S—B—COOH) copolymer and an unsubstituted styrene-butadiene multiblock (S—B—Y—(-B—S)$_n$) copolymer was grafted with an unsaturated polyester to give a grafted block copolymer composition having about 4% by weight of the polyester. The block copolymer mixture was prepared by low efficiency coupling of a diblock copolymer having an initial molecular weight of 13,300 for the styrene block and 65,000 for the butadiene block and contained 34 % by weight of the unsubstituted multiblock copolymer. The diblock copolymer was coupled with carbon dioxide at low effeciency to retain carboxyl substituted diblock copolymer. Low efficiency coupling was acheived by contacting an excess of living S—B—Li molecules with carbon dioxide molecules for 12 minutes. The ratio of living polymer molecules to carbon dioxide molecules charged to the reactor was 1.5:1. However, the necessary ratio to achieve low efficiency coupling varies widely depending on the design of the reaction apparatus which impacts the availability of the carbon dioxide for reaction.

The polyester grafted block copolymer was prepared by the method described in Example 3, in which the polyester/o-dichlorobenzene solution was added over a period of 5½ hrs.

The polyester grafted block copolymer was compounded into a sheet molding composition by the method described in Example 1. The polymer modifier consisted of 19 g of polyester grafted block copolymer and 11 g of base block copolymer.

Table I presents the properties of plaques prepared from the sheet molding compositions.

COMPARATIVE EXAMPLE 4

The base polymer of Example 4 was compounded into a sheet molding composition as described in Example 4. Table I includes properties of the plaque prepared from the base polymer.

EXAMPLE 5

A mixture of a carboxyl substituted styrene-butadiene diblock (S—B—COOH) copolymer and an unsubstituted styrene-butadiene multiblock (S—B—Y—(-B—S)$_n$) copolymer was grafted with an unsaturated polyester to give a grafted block copolymer composition having about 3% by weight of the polyester. The block copolymer mixture was prepared by low efficiency coupling of a diblock copolymer having an initial molecular weight of 12,000 for the styrene block and 65,000 for the butadiene block and contained 46% by weight of the unsubstituted multiblock copolymer. The diblock copolymer was coupled with carbon dioxide at low effeciency to retain carboxyl substituted diblock copolymer. Low effeciency coupling was acheived by the process steps described in Example 4. However, the coupling reaction was conducted in a different reactor which reduced the availability of the carbon dioxide for reaction. The ratio of living polymer molecules to carbon dioxide molecules charged to the reactor was 6:1.

The polyester grafted block copolymer was prepared by the method described in Example 3 in which the polyester/o-dichlorobenzene solution was added over a period of 4 hrs and 10 minutes.

The polyester grafted block copolymer was compounded into a sheet molding composition by the method described in Example 1. The polymer modifier consisted of 24 g of polyester grafted block copolymer and 6 g of base block copolymer.

Table I presents the properties of plaques prepared from the sheet molding compositions.

COMPARATIVE EXAMPLE 5

The base polymer of Example 5 was compounded into a sheet molding composition as described in Example 5. Table I includes properties of the plaque prepared from the base polymer.

COMPARATIVE EXAMPLE 6

An unsubstituted styrene-hydrogenated butadiene diblock (S—EB) copolymer was grafted with an unsaturated polyester to give a grafted block copolymer having about 2% by weight of the polyester. The block copolymer had an initial molecular weight of 5,000 for the styrene block and 72,000 for the hydrogenated butadiene block and contained 10% by weight of coupled polymer.

The polyester grafted block copolymer was prepared by the method described in Example 3, in which the polyester/o-dichlorobenzene solution was added over a period of 4⅔hrs.

The polyester grafted block copolymer was compounded into a sheet molding composition by the method described in Example 1. All of the polymer modifier added was polyester grafted block copolymer.

Table I presents the properties of the plaque prepared from the sheet molding composition.

COMPARATIVE EXAMPLE 7

The base polymer of Comparative Example 6 was compounded into a sheet molding composition as described in Comparative Example 6. Table I includes properties of the plaque prepared from the base polymer.

COMPARATIVE EXAMPLE 8

An hydroxyl substituted styrene-hydrogenated butadiene diblock (S—EB—OH) copolymer was grafted with an unsaturated polyester to give a grafted block copolymer having about 2% by weight of the polyester. The block copolymer had an initial molecular weight of 5,000 for the styrene block and 72,000 for the butadiene block and contained 13% by weight of coupled polymer.

The polyester grafted block copolymer was prepared by the method described in Example 3 in which the polyester/o-dichlorobenzene solution was added over a period of about 4 hours and 10 minutes. A larger amount of p-toluenesulfonic acid was added (0.0507 g) in order to determine if the presence of a larger amount of acid catalyst would result in more polyester incorporation in the grafted block copolymer.

The polyester grafted block copolymer was compounded into a sheet molding composition by the method described in Example 1. All of the polymer modifier added was polyester grafted block copolymer.

Table I presents the properties of plaques prepared from the sheet molding compositions.

COMPARATIVE EXAMPLE 9

The base polymer of Comparative Example 8 was compounded into a sheet molding composition as described in Comparative Example 8. Table I includes properties of the plaque prepared from the base polymer.

EXAMPLE 10

A carboxyl substituted styrene-butadiene diblock (S—B—COOH) copolymer was grafted with an unsaturated polyester to give a grafted block copolymer having about 3% by weight of the polyester. The block copolymer had an initial molecular weight of 13,000 for the styrene block and 61,700 for the butadiene block and contained 24% by weight of coupled polymer.

The carboxyl substituted diblock copolymers were produced by contacting living S—B—Li molecules with a large excess of carbon dioxide in a static mixer. The ratio of carbon dioxide molecules to living polymer molecules exceeded 100:1 in the static mixer.

The polyester grafted block copolymers were prepared by the method described in Example 1. To one reaction mixture, 0.04 g of Ethanox 330 antioxidant was added and did not appear to inhibit the reaction.

The polyester grafted block copolymers were compounded into a sheet molding composition by the method described in Example 1. In both cases, all of the polymer modifier added was polyester grafted block copolymer.

Table I presents the properties of plaques prepared from the sheet molding compositions.

COMPARATIVE EXAMPLE 10

The base polymer of Example 10 was compounded into a sheet molding composition as described in Example 10. Table I includes properties of the plaque prepared from the base polymer.

As shown in Table I, the polyester resin compositions containing an unsaturated block copolymer grafted with an unsaturated polyester (Examples 1, 2, 3, and 4) had improved surface appearance in comparison to the non-grafted base polymers (Examples 1c, 2c, 3c, and 4c). The carboxylated block copolymers grafted with an unsaturated polyester (Examples 5 and 10) exhibited little or no improved surface appearance in comparison to the non-grafted carboxylated block copolymers (Examples 5c and 10c) which already had good appearance. Blends of the block copolymers of this invention with non-grafted block copolymers are exemplified in several examples including Example 3 which exhibited substantially improved appearance and has a much preferred solution viscosity.

TABLE I

| Example No.* | Block Copolymer Substituted | Hydrogenated | Polyester, wt % | Plaque Grade** |
|---|---|---|---|---|
| 1 | none | No | 3 | 3 |
| 1c | none | No | 0 | 2 |
| 2 | hydroxyl | No | 5 | 3 |
| 2c | hydroxyl | No | 0 | 1 |
| 3 | none | No | 3 | 3 |
| 3c | none | No | 0 | 1 |
| 4 | none + carboxyl | No | 4 | 3 |
| 4c | none + carboxyl | No | 0 | 2 |
| 5 | none + carboxyl | No | 3 | 4 |
| 5c | none + carboxyl | No | 0 | 3 |
| 6c | none | Yes | 2 | 4 |
| 7c | none | Yes | 0 | 3 |
| 8c | hydroxyl | Yes | 2 | 4 |
| 9c | hydroxyl | Yes | 0 | 4 |
| 10 | carboxyl | No | 3 | 3 |
| 10c | carboxyl | No | 0 | 3 |

*Samples designated with a "c" are for comparative purposes.
**Scale of 1 to 5 with 5 being the best surface appearance.

While the present invention has been described and illustrated by reference to particular embodiments, reference must be made solely to the appended claims for purposes of determining the true scope of the present invention.

What is claimed is:

1. An improved polyester molding composition which contains an unsaturated polyester and an additional monomer for curing the polyester, the improvement comprising the addition of a low profile modifier which is produced by the process of free-radically grafting an unsaturated block copolymer with an unsaturated polyester in a solvent solution, the block copolymer consisting of at least one block of a monoalkenyl aromatic hydrocarbon and at least one block of a conjugated diene.

2. The molding composition of claim 1 wherein the block copolymer is grafted with the unsaturated polyester in solution with ortho-dichlorobenzene.

3. The molding composition of claim 2 wherein the unsaturated polyester which is grafted to the block copolymer is predominantly a propylene maleate polyester.

4. The molding composition of claim 1 wherein the monoalkenyl aromatic hydrocarbon is styrene and the conjugated diene is butadiene.

5. The molding composition of claim 4 wherein the block copolymer contains hydroxyl groups.

6. The molding composition of claim 4 wherein the block copolymer is an unsubstituted S—B—S block copolymer.

7. The molding composition of claim 6 wherein the low profile modifier is a blend of the grafted block copolymer and a non-grafted, unsubstituted S—B—S block copolymer.

8. The molding composition of claim 7 wherein the grafted and ungrafted block copolymers are produced by coupling living S—B arms with dibromoethane.

* * * * *